W. WENDERHOLD.
SIGNAL DEVICE FOR KINETOSCOPES.
APPLICATION FILED JAN. 13, 1916.

1,346,358.

Patented July 13, 1920.
3 SHEETS—SHEET 1.

WITNESSES:

INVENTOR
William Wenderhold

W. WENDERHOLD.
SIGNAL DEVICE FOR KINETOSCOPES.
APPLICATION FILED JAN. 13, 1916.

1,346,358.

Patented July 13, 1920.
3 SHEETS—SHEET 2.

WITNESSES:

INVENTOR.
William Wenderhold

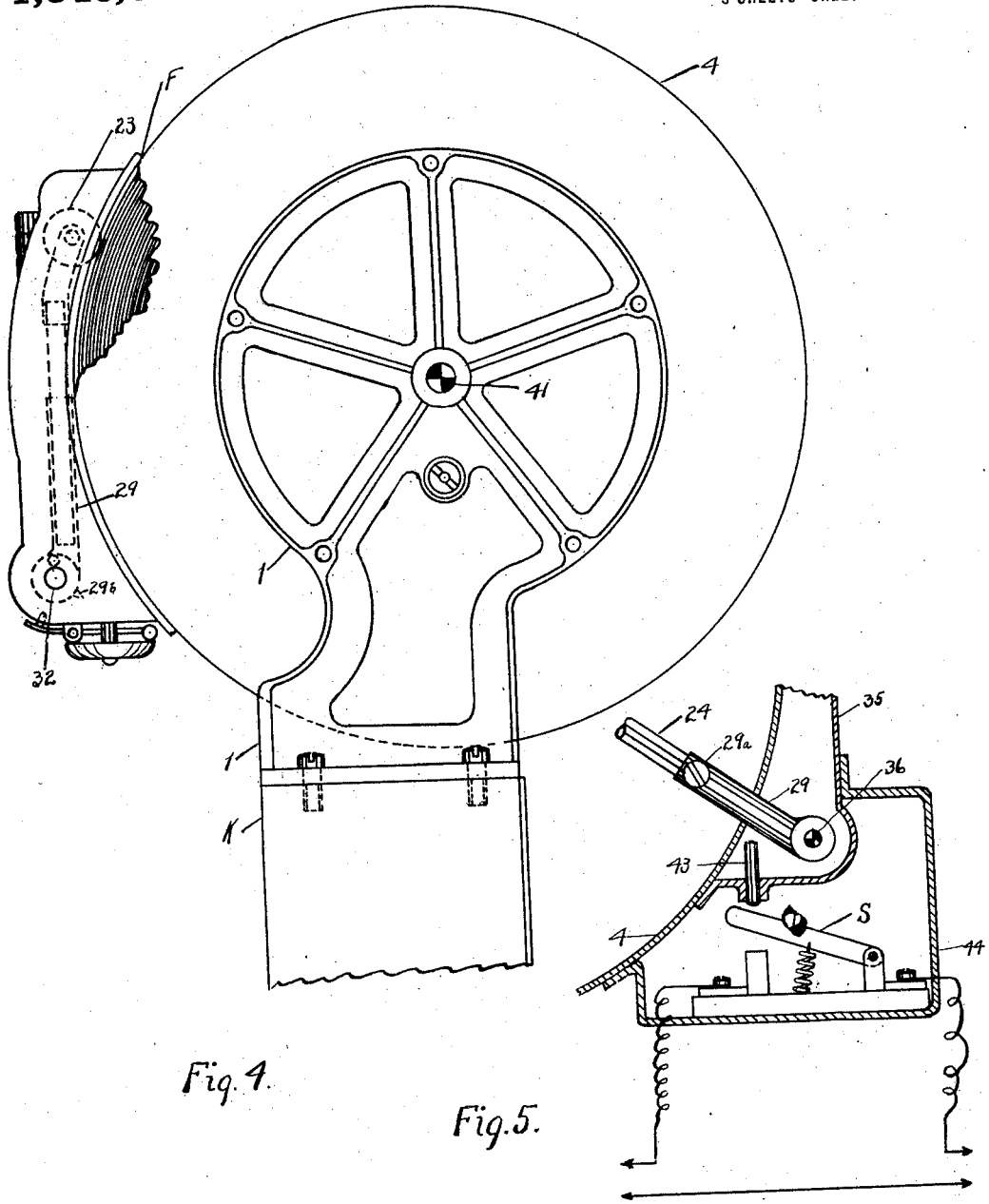

UNITED STATES PATENT OFFICE.

WILLIAM WENDERHOLD, OF NEW YORK, N. Y., ASSIGNOR TO CRU PATENTS CORPORATION, A CORPORATION OF NEW YORK.

SIGNAL DEVICE FOR KINETOSCOPES.

1,346,358.

Specification of Letters Patent.    Patented July 13, 1920.

Application filed January 13, 1916. Serial No. 71,860.

*To all whom it may concern:*

Be it known that I, WILLIAM WENDERHOLD, a citizen of the United States, residing at New York city, in the county and State of New York, have invented certain new and useful Improvements in Signal Devices for Kinetoscopes, of which the following is a clear, full, and exact description.

This invention relates to a signaling device for motion picture machines, the object being to provide a device that will call the operator's attention to the fact that the exhibition of a film is nearing completion.

It is a well known method among motion picture operators to punch or perforate a series of holes in the film near one of its ends to inform him of the approaching termination of the exhibition in progress. A considerable amount of film is damaged by this custom and it is also inefficient, since the operator is apt to miss the signal when he is not watching the screen constantly. I therefore provide a device which will signal by sound, light or any other means of signal, the approach of the end of the film, which device, though controlled by the film, does not require a marking or injury thereof, nor is it necessary for the operator to watch the screen for said signal. The device is preferably mounted near the upper film roll in a kinetoscope and can be adapted to any kinetoscope now in use.

The scope of my invention will be pointed out in the claims.

Referring to the drawings:

Fig. 4 is a partial view of a film magazine containing a roll of film.

Fig. 5 is a partial sectional view of the device showing the arrangement provided to operate an electrical signal.

Figure 1:
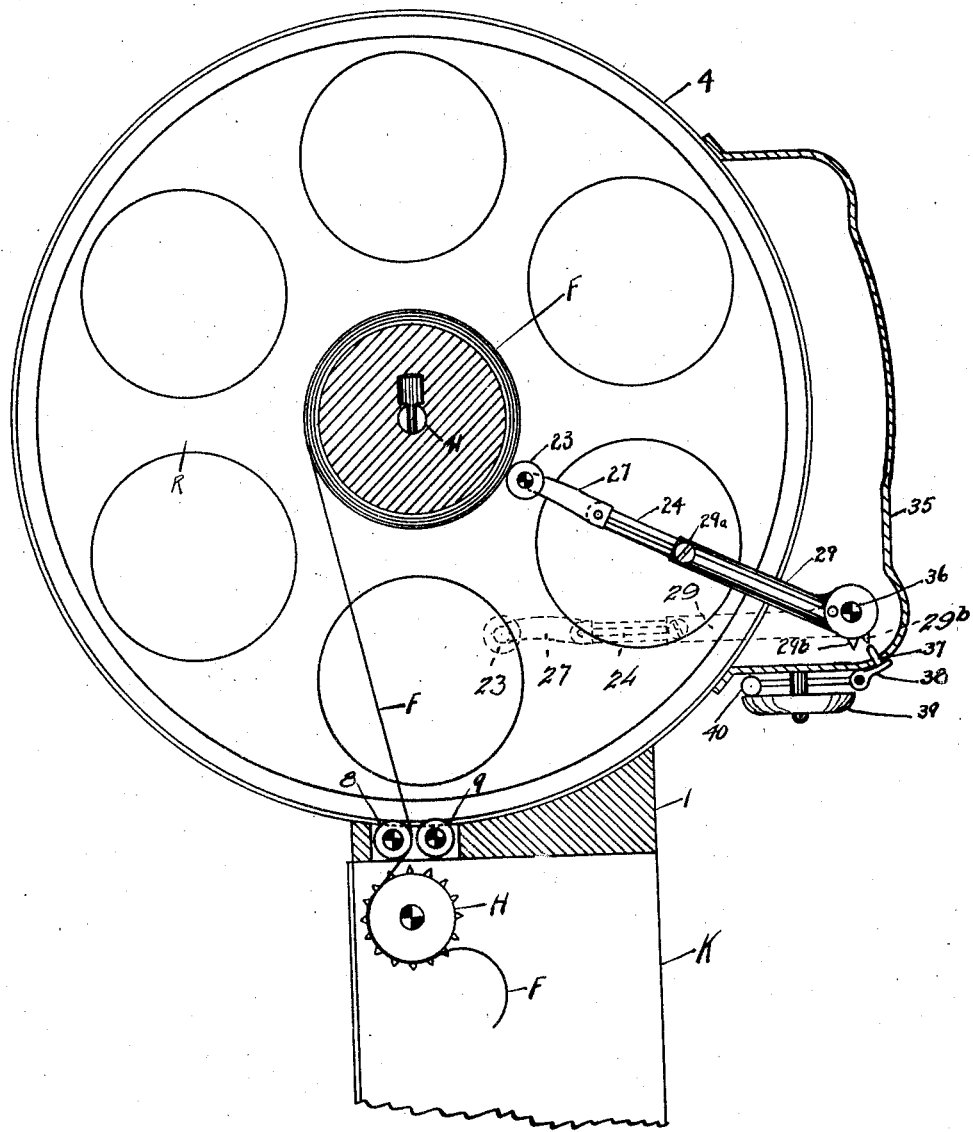
Figure 1 is a vertical section through the device as attached to a kinetoscope.

Referring to the drawing of Fig. 1, 4 is the usual metal magazine box, section 1 being part of its supporting frame. K is the upper part of a kinetoscope, and H is the upper feed sprocket in the same. The film F is received from the usual film reel R, which is supported by shaft 41, which shaft is supported by the general support frame 1. (See Fig. 4).

To accomplish the object in view, I provide a roller 23 to bear against the periphery of the film in the reel R. The roller 23 is mounted in a bracket 27 which is connected with a bar 24. These parts 23, 24, and 27, together with arm 29 in which the bar 24 is socketed, constitute a lever pivoted to turn on the axis 36, so that the weight of the lever will cause the roller thereof to bear upon the periphery of the roll of film. The parts 24, 27, and 23 follow the periphery from the time the film reel is full (see Fig. 4) until it is almost exhausted (see Fig. 1), and will cause the lever to drop past the periphery of the roll when the film thereof is nearly exhausted, and as the lever falls, the point $29^b$ on the arm 29 will hit the pin 37, which will actuate the bell arm 38 and ball hammer 40, giving a signal by the sounding of the bell 39. Thus, the operator knows that the film is nearly exhausted, or as shown in Fig. 5, the arm 29, when dropping will hit the pin 43 and close the electric switch S mounted in the inclosure 44. Of course the electric circuit closing can be used to close the circuit driving another machine and so make a performance absolutely continuous, or it can connect an electric lamp, the lighting up of which can act as a signal where the sound of a bell is not desirable.

The supporting box 35, in which 29 is mounted, is securely fastened on the magazine 4.

The above is a general description of its operation, and I will now proceed to describe some other improvements contained therein. Should the operator desire that the signal should occur earlier or later, it will be observed that the bar 24 is slidably secured within the arm or member 29 and the length of the bar projecting out of the end of the arm can be adjusted and the two parts fastened together after the adjustment has been made by means of the screw $29^a$. The bar can then be moved inward or outward in member 29, thereby causing the roller 23 and its supporting member 29 to drop sooner or later as may be desired.

Another object is to automatically move the lever back into the box 35 when a new film reel is to be placed in the box or when the exhausted reel is to be taken out, which object is accomplished as follows: All film magazines are provided with a door 5 mounted by means of a hinge 3. By opening the door 5, the lever is moved back into box 35, which door must be opened before a reel can be taken out or placed therein. The hinge bracket 3 and hinge shaft 17 upon which a miter gear 18 is mounted will operate miter gear 19, which is loosely mounted on axis 32 upon which is also loosely mounted the arm 29 of the lever.

Figure 3:
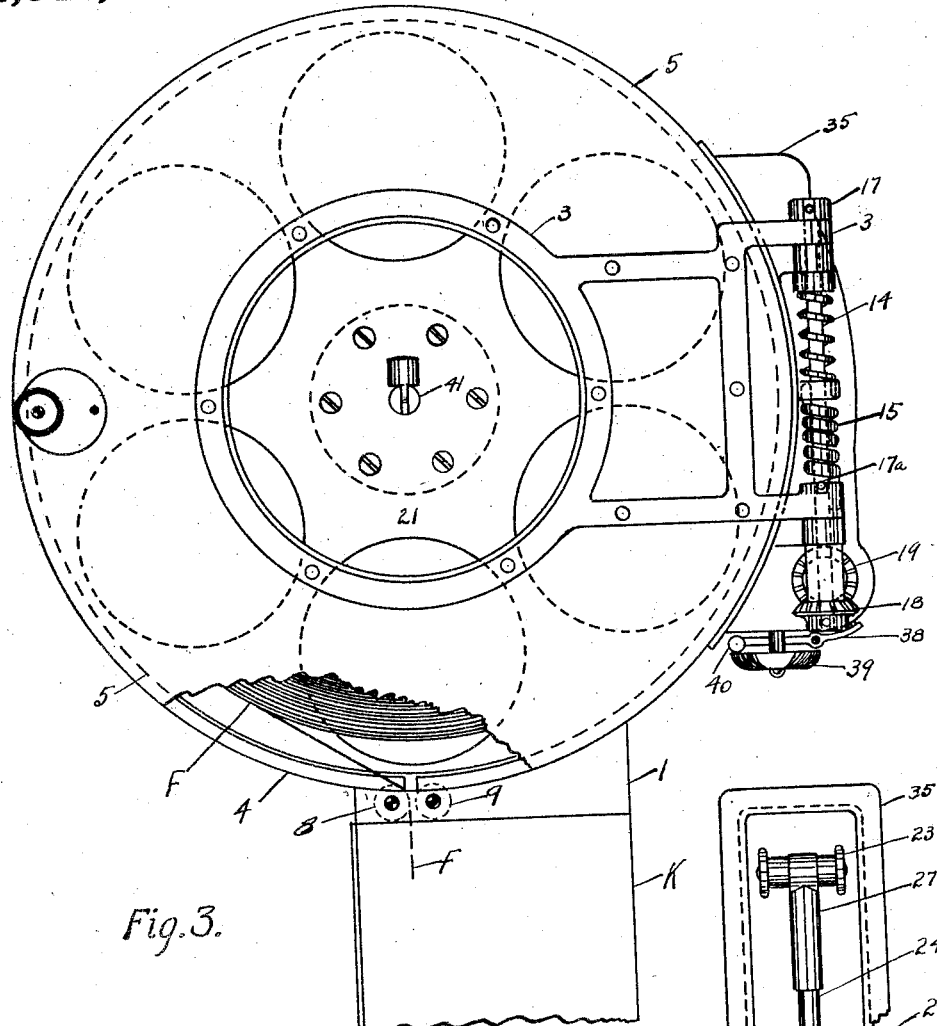
Fig. 3 is an upper magazine as atttached to a kinetoscope.
Figure 2:
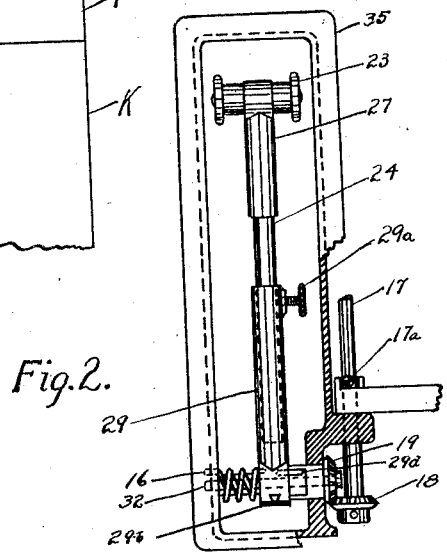
Fig. 2 is a partial view of the attachment.

Now, the arm 29 has a pin 29$^d$ extending into a recess in the miter gear 19 (see Fig. 2), so that when the door 5 is closed, the lever can drop against the film, but since the door 5 is fastened on hinge 3, when the door is being opened the gear will lift the lever by the pin 29$^d$. Therefore, whenever the door is opened, the lever is back in the box 35, and the film reel can be taken out or put in without trouble. The spring 16 mounted between members 29 and 35 furnishes the lever with tension to lie against the film roll F. The spring 14 shown in Fig. 3 is mounted on the hinge shaft 17 for the purpose of keeping the door closed. The spring 15 is mounted on the shaft 17 for the purpose of keeping the pin 17$^a$ which is secured in the shaft against one side of a recess in the hinge bracket 3 so that when the door is opened and the arm 29 is back in the box and it should be desirable to open the door farther, the door can be opened the amount of the recess in the hinge without action on the miter gears 18 and 19. This is purely for the purpose of keeping the door action flexible and not absolutely stopped when the arm 29 is fully back in the box 35.

The rollers 8 and 9 as shown in Figs. 3 and 1, are the usual rollers provided in a kinetoscope or film box. 21 is a glass plate usually mounted in the cover 5 of the film magazine used in a kinetoscope.

What I claim as my invention is:

1. The combination with a film roll, a supporting structure therefor, a roller adapted to contact with the film on said film roll, a support for said roller, an arm pivotally carried by the supporting structure, means for adjustably attaching said roller to said arm, a signal device, and means controlled by the movement of said arm for actuating said signal device.

2. In a motion picture apparatus utilizing a film roll, a pivotally mounted lever adapted to be extended or retracted into various lengths and to contact at its free end with said roll, a screw for retaining said lever in any adjusted length, a support and inclosure for said roll and lever, a door for said inclosure, connections between said door and said lever whereby said lever is withdrawn from the roll when the door is opened, said lever, upon closure of said door, resuming contact with the film roll, such contact continuing until the roll is reduced to a predetermined diameter dependent upon the adjustment of the lever when the lever passes by and out of contact with the roll.

3. In a motion picture apparatus having an inclosure for a roll of film, a pivotally mounted member bearing at one end against the periphery of the roll during its variations in size until it is reduced to a predetermined diameter, when said member moves past and out of contact with the roll, a signal device and means actuated by said member when it moves past and out of contact with said roll for actuating said signal device.

4. In a motion picture apparatus, a container for a film roll, a lever adjustable in length, pivotally mounted in said container and adapted to bear against the periphery of said roll, said lever being so positioned that, when the roll has been diminished to a predetermined diameter, said lever will drop by gravity out of contact with said roll, a signal device, and means actuated by said lever when it drops out of contact with the roll for actuating said signaling device.

5. A motion picture apparatus including a magazine having a door, and an attached supporting box, a member pivoted in said supporting box, to bear against a roll of film within the magazine, said member consisting of a plurality of parts adjustably united to vary the length of said member, and means operated by the movement of said door for moving said member away from the film roll when the magazine is being opened said member being released to bear against the film when the door is closed.

6. In a motion picture apparatus, means to indicate the approaching termination of the supply of film from the film roll, said means consisting of a signal indicating device, a pivotally mounted member, a roller mounted therein and adapted to bear against the periphery of the film roll during the revolution thereof, said pivotally mounted member being adjustable in length so as to move past and out of contact with the periphery of said roll when the latter has been reduced to a predetermined size, the member by such movement operating the signal indicating device to indicate the approaching completion of the film exhibition in progress.

7. In a motion picture apparatus means to indicate the approaching termination of the film supply from a film roll said means comprising a film reel, a support for said reel, a member pivotally mounted on said support, a roller carried at the end of said member and adapted to bear against the periphery of the film roll during the revolution of said roll, said member being adapted to move past and out of contact with the periphery of said roll when the roll has been reduced to a pre-determined diameter, a signal indicating device, and means operated by the movement of said member past the periphery of said roll for actuating said signal indicating device.

Signed at New York city, New York, this eleventh day of January, one thousand nine hundred and sixteen.

WILLIAM WENDERHOLD.

Witness:
ROBERT RICHTER.